United States Patent [19]
Lovingham et al.

[11] 3,826,278
[45] July 30, 1974

[54] MISSILE AND POWERPLANT

[76] Inventors: Joseph J. Lovingham, 72 Wayne Blvd., Madison, N.J. 07940; Hartmann J. Kircher, III, 137 Springbrook Trl., Sparta, N.J. 07871

[22] Filed: Mar. 3, 1967

[21] Appl. No.: 622,879

Related U.S. Application Data
[62] Division of Ser. No. 502,221, Oct. 22, 1965, abandoned, which is a division of Ser. No. 247,443, Dec. 18, 1962, Pat. No. 3,482,404.

[52] U.S. Cl.............................. 137/599, 251/347
[51] Int. Cl.............................................. F17b 1/12
[58] Field of Search ........... 251/117, 120, 124, 301, 251/347; 137/70, 528, 613, 599; 60/242

[56] References Cited
UNITED STATES PATENTS

| 2,721,571 | 10/1955 | Gershon | 137/75 |
| 3,011,309 | 12/1961 | Carter | 60/242 |
| 3,110,295 | 11/1963 | Bendel | 137/613 |

*Primary Examiner*—Verlin R. Pendegrass
*Attorney, Agent, or Firm*—William R. Wright, Jr.

[57] ABSTRACT

A valve for controlling fluid flow through a conduit and having means to reduce flow therethrough upon sliding operation of the valve.

4 Claims, 4 Drawing Figures

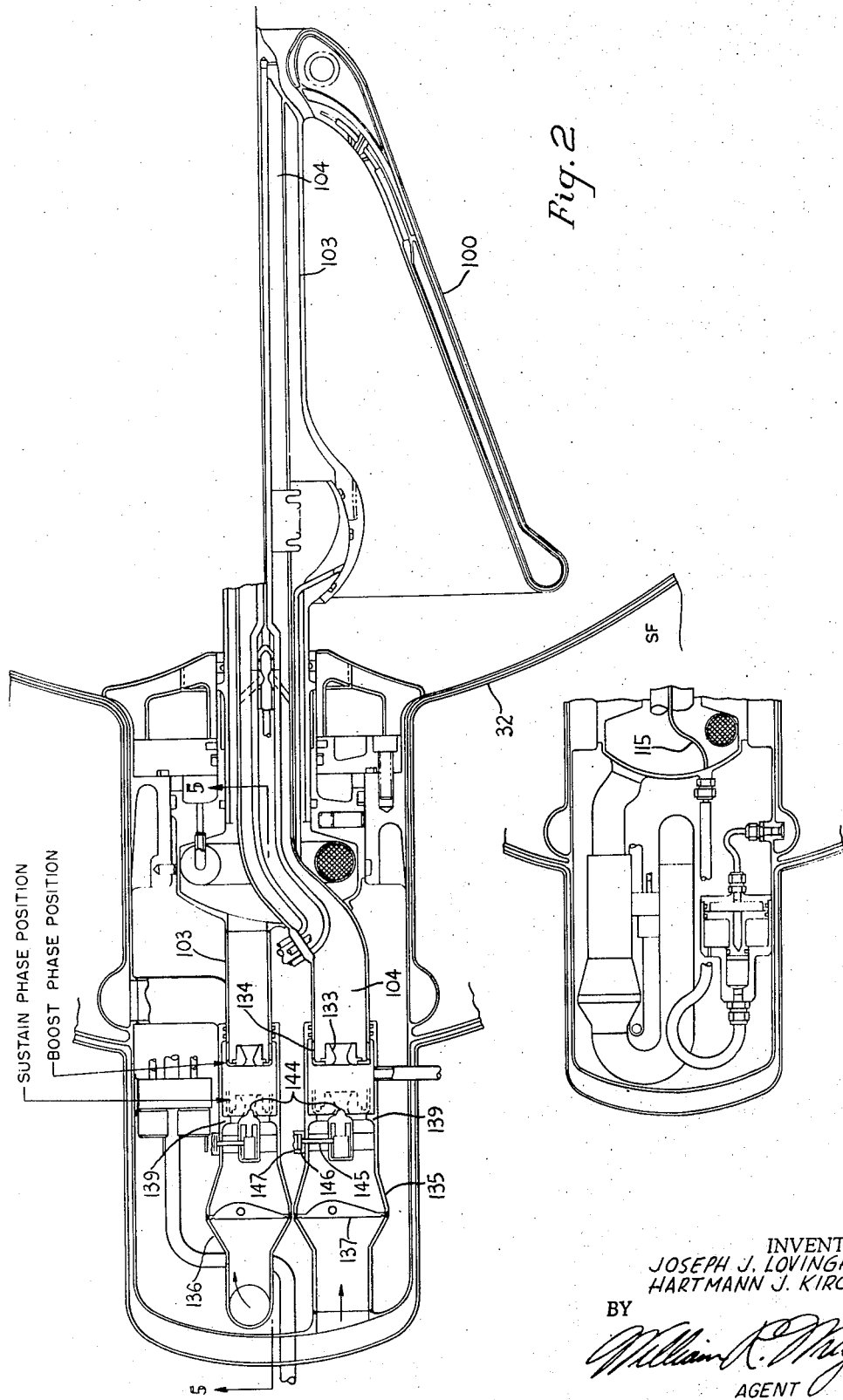

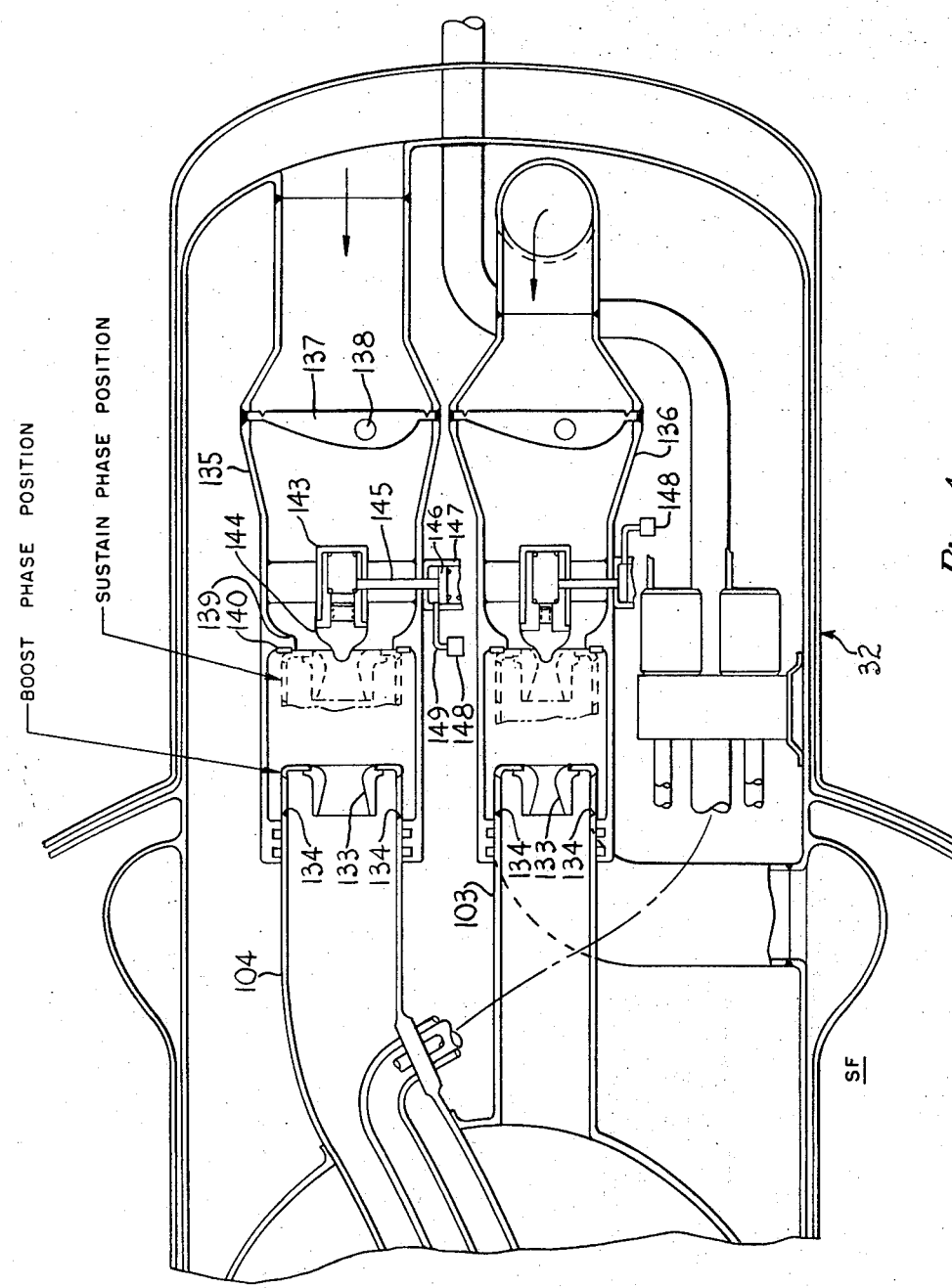

MISSILE AND POWERPLANT

SPECIFICATION

This application is a division of co-pending application Ser. No. 502,221, filed Oct. 22, 1965 and now abandoned which is itself a division of its parent application Ser. No. 247,443 filed Dec. 18, 1962, and now Pat. No. 3,482,404.

This invention relates generally to reaction motors and particularly to an improved rocket powerplant or missile having an improved construction and a novel type of thrust chamber.

Rocket powerplants of various types are well known in the art and most of these are characterized by at least several of a considerable number of disadvantages inherent in each of the various types. Among these disadvantages are: the use of separate thrust chambers for multi-stage operation; a lowered payload or fuel capacity due to the volume of the powerplant occupied by the thrust chamber; an inability to vary the thrust of the powerplant or to effect thrust vector control; the use of complicated control and/or pressurizing systems resulting in added weight and air frame space requirements; an inability to effect packaging of the powerplant; an inability to effect a termination of thrust simply and accurately; and an excessive weight, length and/or cost without resulting in a higher reliability.

The main object of the present invention is to provide a two stage, packaged, liquid propellant powerplant having a propellant flow control valve assembly initially operable by propellant pressure for first stage propellant flow, then operable by pressuring gases to second stage operation, and finally operable to shut down position by spring means.

Other objects and advantages of the present invention will become apparent during the course of the following description.

In the drawings we have shown one embodiment of the invention. In this showing:

FIG. 2 is a fragmentary, central, longitudinal sectional view thereof to an enlarged scale showing the physical relationship of the powerplant thrust chamber, nozzle, and the controls therefor;

FIG. 3 is a fragmentary and similar view to a reduced scale but taken at an angle of 90° with respect to FIG. 2; and FIG. 4 is an enlarged view of the flow control valve assembly portions shown in FIG. 2.

Figure 1:
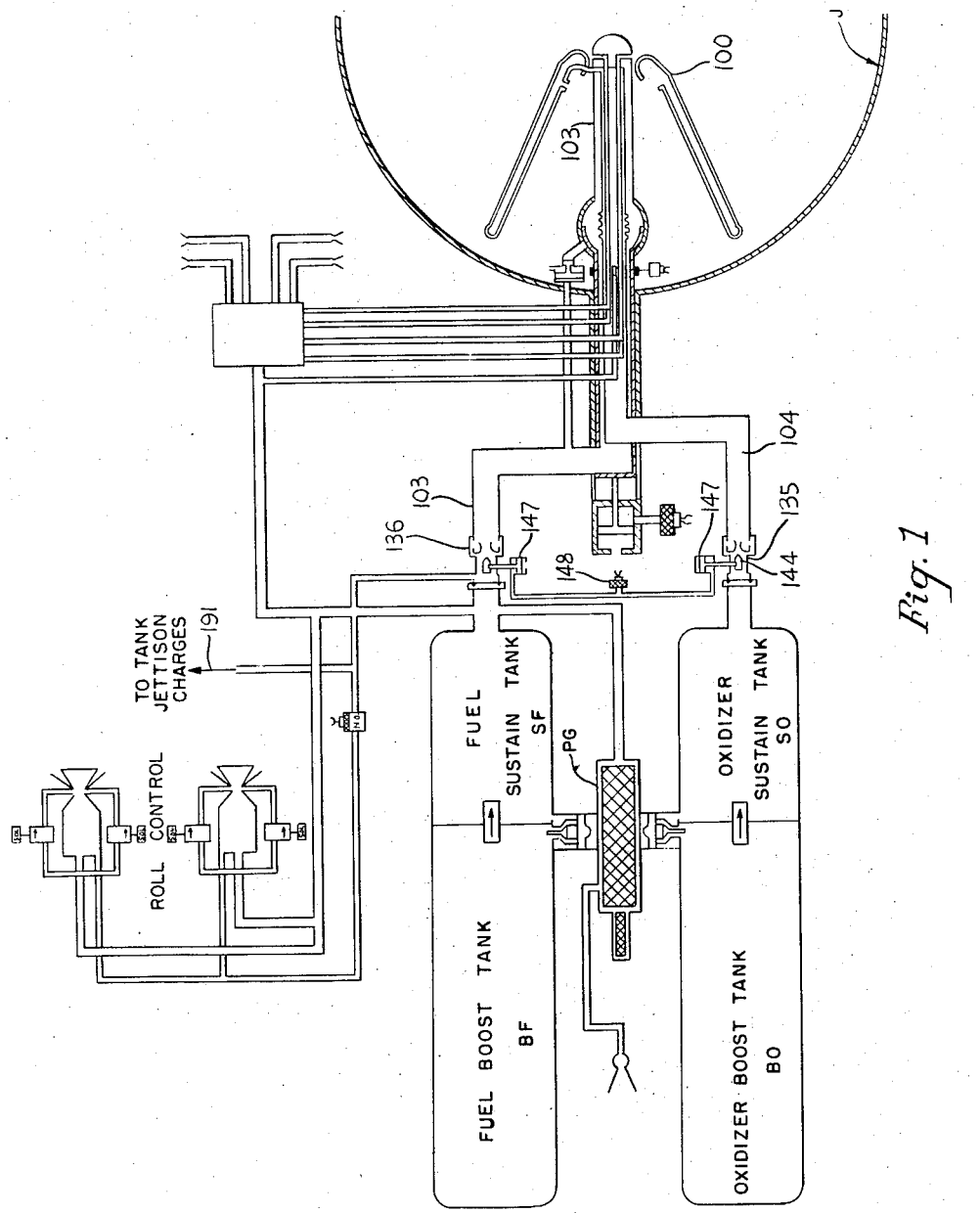
FIG. 1 is a schematic view of the application of the valve assembly to a missile and powerplant.

Referring to the drawings, the improved missile and powerplant includes a sustain fuel tank SF, a sustain oxidizer tank SO, a gas generator chamber PG, and an abutting cylindrical chamber containing guidance controls, etc., all being rigidly connected as an airframe designated as a whole by numeral 32.

A payload which may be a warhead, instrumentation, and/or personnel capsule, guidance, etc. (not shown), is releasably mounted on the forward end of the cylindrical chamber and enclosed by annular, jettisonable boost oxidizer and boost fuel tanks BO and BF respectively which are rigidly connected to each other and to the airframe 32. The boost oxidizer and boost fuel tanks are automatically jettisoned upon conclusion of boost operation phase by shaped charges 191 set off by a control signal. The rocket engine and its controls are mounted centrally in the aft end of the airframe as is conventional.

PROPELLANT FLOW CONTROL

Referring to the figures, it will be seen that the forward ends of the manifolds 103, 104 which are provided with flow restrictors or venturi nozzles 133 and lateral ports 134, are slidably mounted in the aft end of fixed valve housings 135 and 136 which directly communicate respectively with the sustain oxidizer tank SO and the sustain fuel tank SF, the direction of flow therefrom being as indicated by the arrows.

As the valves in the housings 135 and 136 are identical, only the former will be described. Prior to pressurization of the tankage by the solid propellant grain generator PG, flow through the housing is prevented by a hermetically sealed unbalanced butterfly valve 137 which is scored so as to be ruptured and pivot to open position about its shaft 138 by the oxidizer when pressurized.

The housing is provided with an annular shoulder 139 having a seal 140 so as to seal off flow of oxidizer through the lateral ports 134 when the manifolds move to the dotted line or sustain flow position against the shoulder 139. A poppet valve housing 143 is mounted in the valve housing 135 by a spider and a poppet valve 144 is spring urged toward a seat against the restrictor 133 when in sustain position but is held spaced therefrom by a spring urged detent 145 mounted on a piston 146 in a cylinder 147.

When the propellants are pressurized for boost operation, their pressure opens the unbalanced butterfly valves 137 and flow is past the poppet valves 144 and through the restrictors 133 and the lateral ports 134, the manifolds 103 and 104 being in the solid line position shown. Upon conclusion of boost operation, the manifolds move forwardly to the dotted line position shown against the seals 140 of the valve housing shoulders 139 and seal off the lateral ports 134 so that propellant flow is only through the restrictors and is thus throttled simultaneously with throttling movement of the acorn thrust chamber 100. When it is desired to terminate the flow of propellants, a squib 148 is ignited so that pressure gases are conducted to the detent cylinders 147 above the piston 146 by a conduit 149 to retract the pins 145 to permit the spring pressed poppet valves 144 to seat against the restrictors 133.

It is to be noted that each of the propellant flow control means described incorporates three features: that of being hermetically sealed with activation initiated by increasing upstream pressure; throttling from a high rate of flow to a lower rate or the reverse if desired; and release of the poppet valve by squib actuation. Infinite throttling over the entire flow range may be provided with only slight modification.

It is to be understood that the forms of our invention herewith shown and described are to be taken as preferred example of the same and that various changes in the shape, size and arrangement of parts may be resorted to without departure from the spirit of the invention or the scope of the subjoined claims.

We claim:

1. A valve assembly for controlling fluid flow through a conduit comprising, in combination, a tubular housing connectible at its upstream end to a conduit and having an inner, conduit supporting, annular flange including seals at its downstream end, an inner annular shoulder formed in said housing at a point spaced from said flange, and a second conduit slidably mounted in said sealed flange for movement of its end from a first position to a second position against said annular shoulder, the upstream end of said second conduit including lateral ports adjacent thereto and a constrictor mounted therein to permit fluid flow therethrough in said first position, said shoulder sealing off fluid flow through said ports when said second conduit is in said second shoulder engaging position to reduce fluid flow therethrough.

2. The valve assembly recited in claim 1 wherein a spring pressed valve is mounted in said housing adjacent and in axial alignment with said constrictor and is seatable concentrically therein to shut off fluid flow when said second conduit is in said second position.

3. The valve assembly recited in claim 2, and a detent extending through said housing and engageable with said spring pressed valve to prevent its seating against said constrictor.

4. The valve assembly recited in claim 2, and fluid pressure means connected to said detent and operable to disengage it from said valve to shut off fluid flow in said housing.

* * * * *